April 16, 1968   E. GODO   3,377,733
MACHINE FOR HANDLING A HALIBUT LONG LINE AND THE LIKE
Filed Sept. 21, 1965   7 Sheets-Sheet 1

Fig.1.

EINAR GODO
INVENTOR

Seed & Berry
ATTORNEYS

April 16, 1968 E. GODO 3,377,733
MACHINE FOR HANDLING A HALIBUT LONG LINE AND THE LIKE
Filed Sept. 21, 1965 7 Sheets-Sheet 2

EINAR GODO
INVENTOR

ATTORNEYS

April 16, 1968 E. GODO 3,377,733
MACHINE FOR HANDLING A HALIBUT LONG LINE AND THE LIKE
Filed Sept. 21, 1965 7 Sheets-Sheet 3

EINAR GODO
INVENTOR

Seed & Berry
ATTORNEYS

EINAR GODO
INVENTOR

ATTORNEYS

April 16, 1968  E. GODO  3,377,733
MACHINE FOR HANDLING A HALIBUT LONG LINE AND THE LIKE
Filed Sept. 21, 1965  7 Sheets-Sheet 5

EINAR GODO
INVENTOR

Seed & Berry
ATTORNEYS

United States Patent Office 3,377,733
Patented Apr. 16, 1968

3,377,733
MACHINE FOR HANDLING A HALIBUT
LONG LINE AND THE LIKE
Einar Godo, 17103 NE. 16th Place,
Bellevue, Wash. 98004
Filed Sept. 21, 1965, Ser. No. 489,013
12 Claims. (Cl. 43—4)

The present invention relates generally to a device for handling long lines commonly used for taking bottom fish such as halibut, cod etc., wherein a ground line is provided with spaced gangions which carry the fish hooks. More specifically, the present invention relates to a device for automatically unwinding the gangion from the ground line as it is hauled in, baiting the hook and coiling the ground line, gangion and baited hooks so as to be ready for reuse.

The type of gear used in long line bottom fishing consists of a ground line having a plurality of gangions tied thereto at spaced intervals with each of the gangions being provided with a fish hook. The length of the gangions and their spacing on the ground line depends upon the type of fish which is to be caught. As an example, in halibut fishing, the gangions are placed on the ground line at intervals of from 9 to 13 feet with the gangions being 3 to 4 feet in length and having a diameter of approximately 1/8 inch. The ground lines may have a diameter of from 1/4 to 5/16 inch and have a length of from 1500 to 1800 feet. Each individual length of ground line is known as a "skate" and a number of skates, typically 3 to 7, are tied together and called a string of gear. After the skates have been baited and tied together, the string of gear is thereafter set in the water.

The setting of a string of gear is accomplished by fastening one end to an anchor which is provided with a buoy line and a buoy. The buoy and buoy line are let out first and then the anchor is thrown overboard followed by the skates which run out through a chute at the rear of the boat, and an attendant fastens a second anchor to the other end of the string of gear. The second anchor is also provided with a buoy line and a buoy all of which are in turn put into the water.

After the string of gear has been on the bottom for a certain length of time, depending upon the particular fishing ground, it is taken back aboard the boat and the fish are removed. The gear is taken in by first taking in the buoy and buoy line so as to raise the anchor. The buoy line is then coiled onto the deck and the skate is hauled in over a roller at the boat railing. A man at the roller normally takes the fish off the hooks as the skate is hauled in and the skate is coiled onto the deck. According to prior art methods, each skate is then carried by hand to another location on the boat where the hooks are baited and the skate recoiled so as to be ready for resetting. Since the gangions become wound around the ground line when the gear is taken in, they must be unwound by hand before the hooks are baited and then the skate must be coiled by hand so as to be ready for resetting. As will be appreciated by those familiar with the procedure, the job of taking in the skates, coiling them on deck, removing the turns of gangion wound around the ground line, baiting the hooks and making the skate ready for reuse is very time consuming and hard work. In addition, those performing the work are apt to experience damage to the hands because of steady contact with the rough gear.

According to the present invention, an automatic device is provided for handling the gear without the need for the manual labor required in prior art. As the skate is being hauled in, the present device provides means for determining the direction and number of turns of the individual gangions about the ground line and registering this information in a control system by storing pulses. The stored pulses in the control system are then used to control the unwinding of the gangion in the proper direction and correct number of turns by means of a turn remover which rotates around the ground line. After the gangions are unwound, means are provided for automatically baiting the hooks on the gangions from a movable bait magazine. The device then coils the skate onto the deck or in a tub or the like with the baited hooks properly oriented so that the skate is ready for resetting.

The primary object of the present invention, is therefore, to provide a device for hauling in a halibut long line or the like, unwinding individual gangions from the lines, baiting hooks carried on the gangions and coiling the line ready for resetting.

Another object of the present invention is to provide a device of the character described which is completely automatic in operation with no need for manually handling the line, gangions and hooks.

Another object of the present invention is to provide a device of the character described wherein the direction in which the gangion is wound about the line and the number of turns of the gangion are sensed and the information stored in an electrical control system which controls the operation of a turn remover.

A further object of the present invention is to provide a device of the character described wherein the turns of the gangions are removed by rotating the gangion about the line as the line is hauled in.

A further object of the present invention is to provide a device of the character described wherein the moving hook passes through a bait magazine and wherein the movement of the hook is used to step the magazine so as to advance the bait into position where it can be picked up by the hook.

A still further object of the present invention is to provide a device of the character described which coils the line and orients the gangions and baited hooks in a manner to prepare the line for resetting.

Other more particular objects and advantages of the invention will, with the foregoing, appear and be understood from the following description and claims, the invention consisting of the novel construction and adaptation and combination of parts hereinafter described and claimed. Reference is made now to the accompanying drawings in which:

Figure 1:
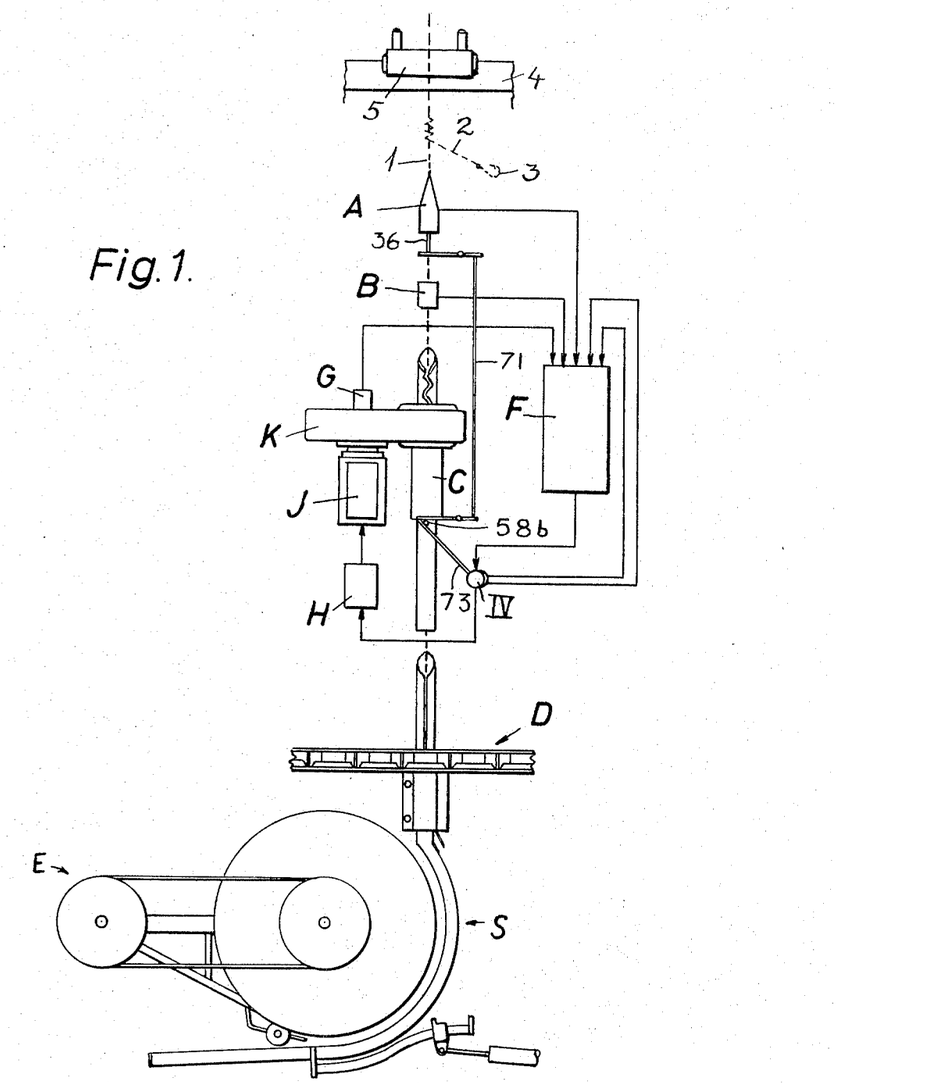
FIG. 1 is a schematic of the components of the present invention.

Referring now to the drawings wherein like reference numerals indicate identical parts in the various views, FIG. 1 illustrates the various components according to the present invention. As shown schematically in FIG. 1, the ground line 1, with its gangions 2 and hooks 3, is taken in from the water at a constant speed by a power-driven gurdy S and clears the vessel railing 4 over a roller 5. It is to be noted that the roller 5 should be vertically positioned so as to align the incoming line 1 with the groove in the sheave of the gurdy S. This may be accomplished by mounting the roller 5 in a vertically adjustable mounting (not shown) if desired so as to effect the alignment. This alignment is important to insure that the line will not roll on one or the other side of the gurdy sheave so as to cause the line to twist thus further winding the gangions about the line.

Before the turns of each gangion 2 around line 1 can be removed, the turn direction must be determined. This takes place while the gangion is pulled, with the ground line, through the turn direction finder A which registers the direction the gangion must be unwound, to the left or to the right, and mechanically stores this information for later sending an electrical signal, in accordance with the stored turn direction, to the control system F. The gangion then passes through a turn counter B having an electro-mechanical switching mechanism which sends a number of pulses, in accordance with the number of turns of the gangion around the ground line, to the control system F for storage.

The registered turns of the gangion are removed while passing, with the long line, through a rotating turn remover C wherein the related hook 3 is held and moved around the ground line the proper number of turns to unwind the gangion. Turn remover C informs the control system F when it is ready for a new hook, and how fast the turns are to be removed. A shaft encoder G, which is mechanically connected to the turn remover C, informs the control system F of how many turns have been removed.

The control system F collects all the above-mentioned information necessary for unwinding the gangion from the ground line in the correct direction and at the right speed. The control system F controls the turn remover through an amplifier H, a hydraulic motor unit J and a gear box K. The use of a pulse from the turn direction finder A is mechanically accomplished by a ring on the turn remover, the movement of which, through an actuator and a mechanical linkage, produces the release of a pulse from the turn direction finder A and also indicates that the turn remover is reset for a new hook.

After passing through the turn remover C, the cleared gear enters an automatic baiter D, a holder for the baited hooks, and a coiler E. The baiter, hook holder and coiler function independently of the control system F and operate to receive the ground line, gangion and hooks as will be described.

Figures 4, 5, 6:
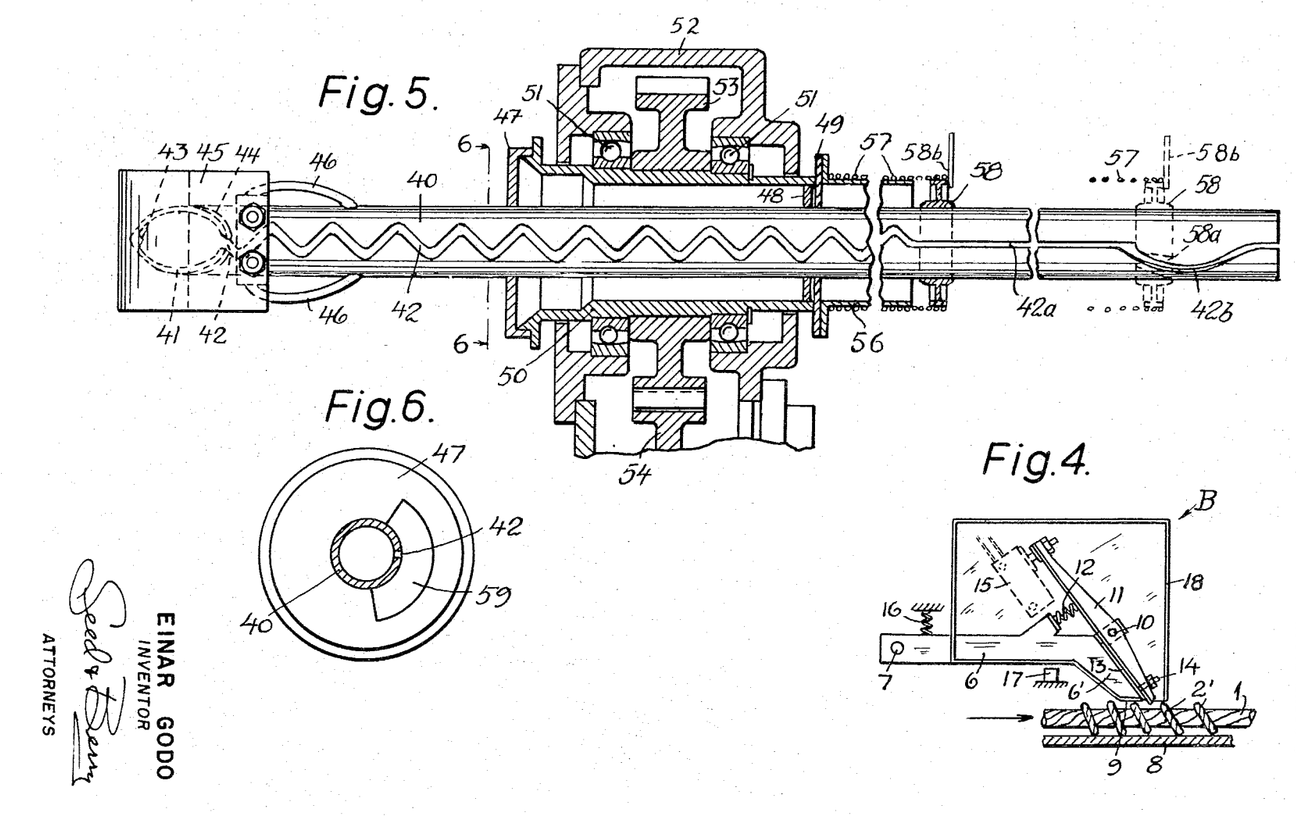
FIG. 4 is a side elevation of the turn counter.
FIG. 5 is a partially sectioned plan view of the turn remover.
FIG. 6 is a cross sectional view taken along lines 6—6 of FIG. 5.
Figure 7:
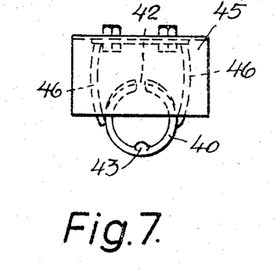
FIG. 7 is an end elevation of the pipe portion of the turn remover shown in FIG. 5.

The individual mechanisms or components of the device will now be described in detail. Referring to FIG. 4, the turn counter B includes a horizontal arm 6 which is journal-mounted at one end to turn on a horizontal shaft 7. The arms free moving end is offset at 6' toward the ground line 1 which, at this point, is moving along the face of a horizontal flat backing plate 8 in the direction indicated by the arrow. It will be noted that the toe 9 of the offset 6' is urged by a spring 16 to press on the ground line 1 and the turn 2' of the gangion. To the free end of the arm 6 is fastened a shaft 10 on which is pivoted a rocker arm 11. The arm 11 has its contact end fitted with an adjusting screw 14 to engage a sloped stop 13 on the arm 6 such that the rocker arm assumes a position at an acute angle with the incoming travel path of the ground line. The contact end of the rocker arm 11 extends below the toe 9 such that each time a gangion turn 2' passes, it will rock the arm 11 in a counterclockwise direction causing the other end of the rocker arm to actuate a switch 15 and send a pulse to the control system F. The rocker arm 11 is constantly biased in the clockwise direction by means of the spring 12. To prevent the toe 9 from pressing against the ground line 1 under action of the spring 16, a stop 17 is provided. The rocker arm 11 and the switch 15 can be enclosed by a capsule 18 or the like which is fastened to the arm 6 in a suitable manner.

Figure 2:
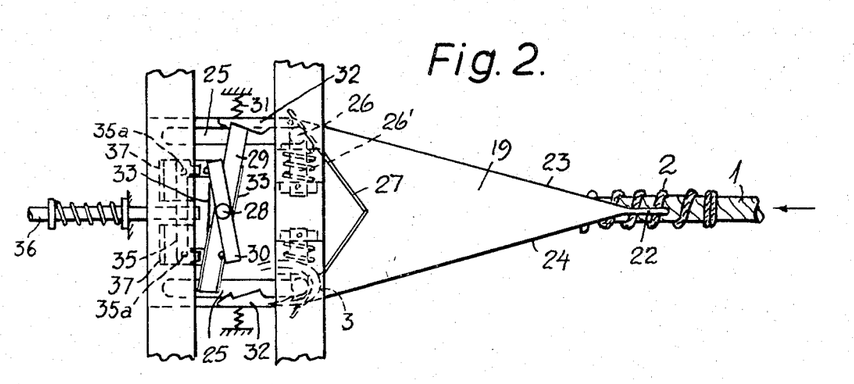
FIG. 2 is a plan view of the turn direction finder.
Figure 3:
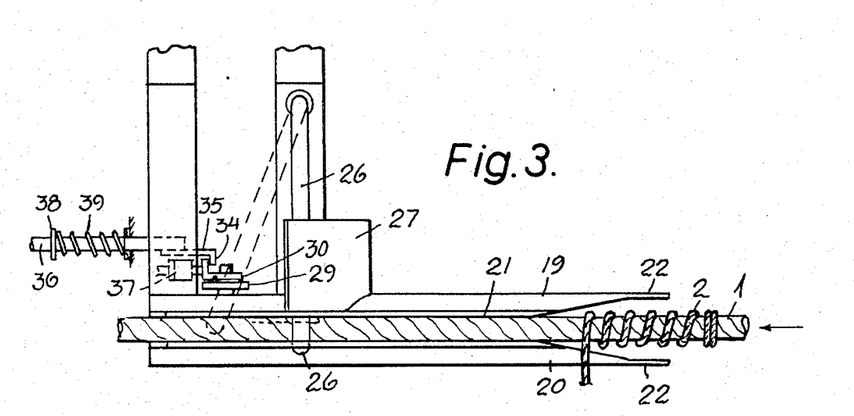
FIG. 3 is a side elevation of the turn direction finder.
Figure 3A:
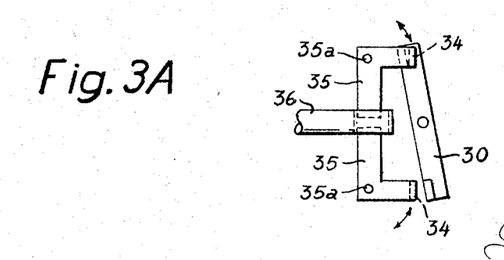
FIG. 3A is a detailed plan view of a portion of the turn direction finder.

Before the turns of the gangion 2, wound around the ground line, can be unwound, the winding direction must be determined and registered by the turn direction finder A which is placed before the turn counter B and is shown in detail in FIGS. 2, 3 and 3A. Referring to FIGS. 2 and 3, two horizontal plates 19 and 20 are vertically spaced with an opening 21 therebetween to receive the ground line 1. These plates are laterally tapered in the direction of the incoming ground line 1 in such a manner that the sides 23–24 converge to tips 22 which occupy the vertical midplane of the ground line. The plates 19 and 20 are dished oppositely along their longitudinal center line to provide a groove effect to guide the ground line 1 through the device.

The rear ends of the converging sides of the plates 19 and 20 have through-going longitudinal slots 25 into which the lower free ends of a pair of swingable rods 26 project and normally extend completely across the spacing 21 between the plates. The upper end 26' of each of the rods 26 is bent toward one another at right angles to provide horizontal trunnions on which the rods can swing against the force of spring devices which surround the ends 26' and which normally hold the rods pressed against the forward ends of the slots 25. When a gangion 2 is approaching the turn direction finder, its hook 3 is usually dangling relative to the long line on a side thereof determined by the turn direction (right or left hand) of the gangion around the long line. Hence, when the hook reaches the tip 22 it will be on one side or the other thereof, and as it passes the tips, will be deflected to the respective side of the plates 19–20. In the illustrated example, the hook is assumed to have moved along the side 24 and, as a consequence, the hook will catch the rod 26 on that side of the device and swing the same forwardly until the lower end of the rod 26 is swung far enough above the lower plate 20 to permit the hook to slide off the rod and thereby be free to continue, whereupon the rod 26 is spring-urged to return to its initial position. To insure that the hook, in case it should arrive on top of the pipe 19 rather than dangling along side of the plate 20, will catch on the rod 26, there is a plough-shaped deflecting shield 27 on the top side of the plate 19, the ends of which extend beyond the plate edges.

At the rear and on the top side of the plate 19 is a vertical shaft 28 upon which superimposed links 29 and 30 are centrally journaled for free independent rotation. The ends of the link 29 are operatively associated with respective blocking pieces 32 which are pivoted at their forward ends and are loaded by springs 31 to swing toward one another. The blocking pieces are so shaped and arranged that when the right-hand rod 26, for example, is swung rearwardly as shown in dotted line in FIG. 3, it releases right-hand piece 32 and swings the link 29 about the shaft 28 such that the other end of the link is moved into blocking arrangement with the other blocking piece 32 and is held in the position shown in FIG. 2 of the drawings. The link 30, which is normally held parallel to the link 29 by virtue of the leaf springs 33 acting therebetween, is held in position while swinging the link 29 by a piece 34 on one of a pair of cross pieces 35 positioned on the pivots 35a as shown in detail in FIG. 3A. The cross pieces 35 have their inner ends mounted in a slot on a shaft 36 which is parallel to the motion of the ground line such that the link 30 is held turned in the opposite direction from the link 29 and against the force of the springs 33 by the piece 34. Electric switches 37 are mounted in the plane of the link 30 so that the link 30 may operate one or the other of the switches when it is released.

When the turn remover presently to be described has returned to its initial condition, it is ready to initiate a signal to be produced by the rod 36 and link 30. The rod 36 is pushed against the spring 39, seated on the flange 38, and rotates the cross pieces 35 about the shafts 35a by its forward movement, whereby the link 30 is released from the associated piece 34 and is forced by the spring 33 to line up with the link 29. The link 30 by this movement thus contacts and closes one of the switches 37 and sends a pulse in accordance with the turn direction to a potentiometer in the control system F, which will later be described. In this manner, the turn direction finder will, by operation of the links 29 and 30, close one of the switches 37 to register the turn direction of the gangion about the ground line and send a pulse in accordance with the turn direction to the control system in response to the resetting of the turn remover.

The turn remover C is shown in detail in FIGS. 5 to 8. As shown in FIG. 5, the turn remover has a rotatable pipe 40 through which the ground line 1 moves in the axial direction as it comes from the turn counter. The direction of movement of the line through the pipe is from the entrance of the pipe to the right, as viewed in FIG. 5. The entrance of the pipe is cut at an angle as shown at 41 and the pipe includes a slot 42 of wave or zigzag form which extends from the upper edge of the entrance along the length of the pipe. As the ground line passes through the pipe and a hook 3 is caught by the edge of the pipe, it is moved along the angled portion 41 and into the slot 42. To prevent knots from being caught in the sharp end of the entrance 41, the bottom edge thereof is provided with a rounded portion 43. To insure the hook's movement around the wall of the entrance, the wall of the pipe is thickened as shown at 44 from both sides toward the opening of the slot 42. In addition, the spring plate 45 is mounted in front of the pipe entrance and extends across the sloping plane of the pipe entrance so as to cover the top portion of the entrance and opening of the slot 42. The plate 45 thus prevents the hook from catching in the entrance of the slot and is mounted on the pipe by means of mounting arms 46 which are welded to the pipe.

Figure 8:
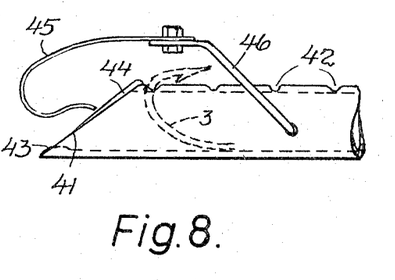
FIG. 8 is a side elevation of the portion of the pipe shown in FIG. 7.

As shown in FIG. 8, the width of the hook is greater than the diameter of the pipe 40 such that the end of the hook will ride outside of the pipe and, because of the wave form of the slot, the hook will not fall out of the pipe 40 during its rotation. The pipe 40 is provided with flanges 47, 48 and 49 which support the pipe in the center of the hollow shaft 50 in fixed relation thereto. The shaft 50 is rotatably mounted in the gear box housing 52 by means of the bearing assemblies 51 and is provided with a gear 53 which meshes with drive gear 54 driven by a hydraulic motor as will be later described. A second hollow shaft 56 is fixed to the flange 49 and rotates therewith. A spring 57 is mounted on the shaft 56 and has its outer end connected to the ring 58 which is mounted for longitudinal sliding movement on the pipe 40 and keyed for rotation therewith. As shown in FIG. 5, the waved or zigzag portion of the slot 42 terminates at the free end of the shaft 56 and the slot continues in a straight line portion 42a which terminates in a curved portion 42b adjacent the end of the pipe.

During operation, as the ground line is pulled through the pipe 40, a hook is pulled through the slot 42 and into the straight portion 42a of the slot where the end of the hook catches the ring 58 and moves it along against the bias of the spring 57, thus keeping the gangion 2 taut. When the hook enters the curved slot portion 42b, the slot will move the hook off the ring 58 and through a slot 58a in the ring. The ring is then free and is returned to its initial position shown in FIG. 5 by the spring 57. The return motion of the ring 58, by means of the actuator arm 58b, is used to reset the turn direction finder A for the next gangion as will later be described. Although shown only schematically in the drawings, it will be understood that the actuator arm 58b will be supported independently of the ring 58 by any desirable means so as to move longitudinally of the turn remover responsive to the movement of the ring and to be unaffected by the rotation of the ring. The flanges 47 and 49 which connect the pipe 40 to the shaft 50 each have an opening 59, as shown in FIG. 6, to allow the hook to pass therethrough. During movement of the ground line, hooks and gangions through the pipe 40, the gangion has been unwound from the ground line 1 by rotation of the pipe 40.

Figure 9:
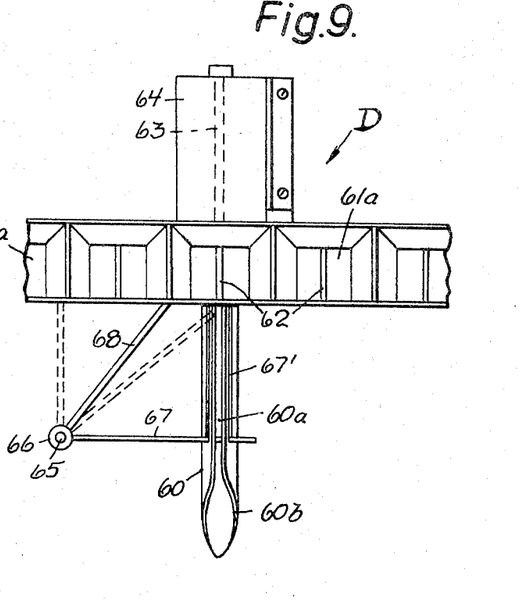
FIG. 9 is a plan view of a portion of the bating mechanism.
Figure 10:
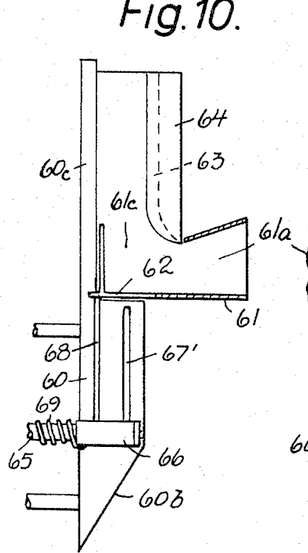
FIG. 10 is a side elevation of the device shown in FIG. 9.
Figure 11:
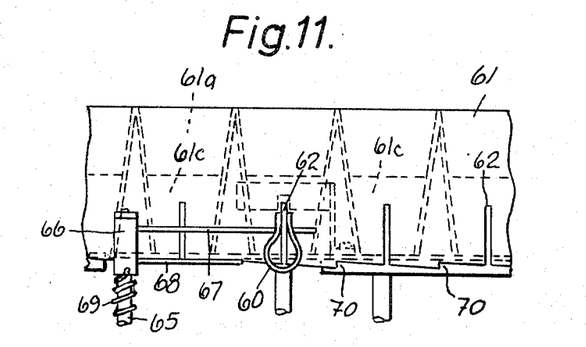
FIG. 11 is an end elevation of the device shown in FIG. 9.
Figure 12:
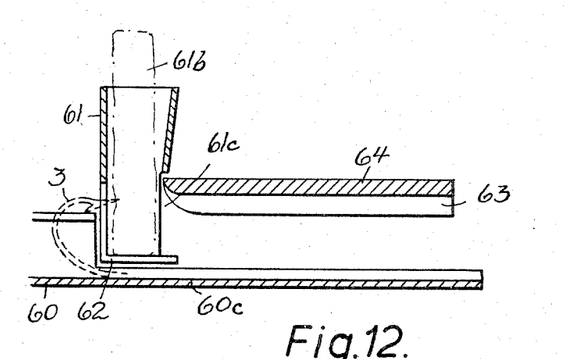
FIG. 12 is a sectional view of the baiting magazine.
Figure 13:
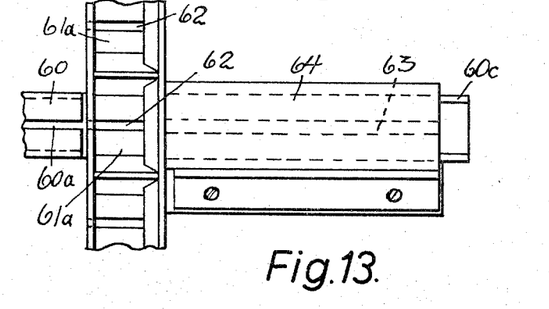
FIG. 13 is a plan view of the magazine shown in FIG. 12.

The baiter D is shown in detail in FIGS. 9 to 13. Referring to FIG. 9, the baiter consists of a pipe 60 through which the ground line 1 is drawn in a straight line from the pipe 40 of the turn remover. The pipe 60 is formed with a longitudinal slot 60a in its top surface as shown in FIGS. 9 and 11 and the entrance of the pipe is formed at an angle as at 60b such that the hook is caught and guided into the slot 60a. Extending transversely of the pipe 60 is a movably mounted bait magazine 61 with a row of separated pockets 61a containing pieces of bait 61b. It will also be noted that the magazine extends into the body of the pipe 60 as seen most clearly in FIGS. 10 and 12. Thus, when a pocket 61a is moved into alignment with the pipe 60, a slot 62 in the magazine is in alignment with the slot 60a to permit the hook 3 to pass through the pocket 61a and hook into the bait 61b carried in the pocket as shown in FIG. 12. The back side of the pocket 61a has an opening 61c through which the bait is dragged by the hook 3, the hook continuing through a slot 63 in the underside of a block 64 and the extended portion 60c of pipe 60 which supports the moving hook and bait.

Mounted adjacent the pipe 60 is a fixed vertical shaft 65. Rotatably mounted on the upper end of shaft 65 is a rotatable sleeve 66. Fixed to the sleeve 66 are two vertically spaced radially extending arms 67 and 68 which are disposed at an angle. The upper arm 67 moves in the longitudinal slot 67' against the forward end of the slot 67' adjacent the entrance to the pipe 60. The lower arm 68 extends under the wall of the magazine 61 which is provided with saw teeth 70 as shown in FIG. 11 with which the arm 68 cooperates to move or step the bait magazine 61. In operation, as the ground line 1 is pulled through the pipe 60, the hook 3 engages the edge 60b of the entrance of the pipe and is led into the slot 60a with the hook in a vertical position as shown in FIG. 12. As the hook moves into the slot 60a, it contacts and rotates the rod 67 against the force of the spring 69 in a counterclockwise direction as seen in FIG. 9. At the same time, the arm 68 contacts a tooth 70 on the bottom side of the magazine 61 and moves the magazine one step equivalent to one bait pocket such that the slot 62 in the next pocket comes into alignment with the slot 60a in the pipe 60. As the hook continues it slides off the end of the arm 67 and the arms 67 and 68 are forced into the initial position shown in FIG. 9 by the spring 69. The arm 68 is biased upwardly by virtue of a spring 69 and rotates into the next saw tooth 70 on the bottom of the magazine 61. As the ground line continues its forward motion, the hook 3 goes through the piece of bait 61b in the aligned pocket and the bait is pushed down on the hook by the front end of the stationary block 64. The bait is thus dragged along with the hook and they both pass through the opening 61c and are guided into the slot 63 in the block 64.

The overall operation of the various components thus far described will now be explained in detail with reference to the control system shown in FIG. 14. The sheave or gurdy S illustrated in FIG. 1 hauls in the ground line at a given speed and the fish are removed manually before the ground line 1, with gangions 2 and hooks 3, are moved into the respective mechanisms of the device. Although FIG. 2 illustrates the situation wherein the gangion is wound about the ground line in such a manner that the hook 3 approaches the turn direction finder A ahead of the gangion, it will be realized that it is equally possible that the gangion will be wound about the ground line in such a manner that the turns of the gangion will enter the turn direction finder ahead of the hook. It will be understood, however, that the relative position of the hook either ahead or behind the turns of the gangion have no effect on the functioning of the device since, in any event, the hook will ready the turn direction finder A by positioning the link 29 as previously described, to thus store the correct turn direction information before the turn counter B has finished its counting function. In the event that the hook precedes the turns of the gangion, as illustrated in FIGS. 2 and 3, the link 29 will be set into position to actuate the link 39 when the rod 36 is moved so as to close the switch 37 prior to functioning of the turn counter B. If the hook 3 follows the turns of the gangion, the only result is that the turn counter B will have begun its count prior to positioning of the link 29.

When the gangion 2 enters the turn counter B, the number of turns is counted by means of the arm 11, as described in connection with FIG. 4, which jumps a number of times equal to the number of turns 2', taking into account the knots in the gangion. As illustrated in FIG. 14, the counter B sends a number of pulses equal to the number of turns in the gangion to the amplifier I which drives the stepping motor II which drives the potentiometer III. Every pulse the turn counter sends out is thus stored by the stepping motor on the potentiometer III until the total count or pulses are stored. The output voltage of the potentiometer III is the supply voltage to the potentiometer IV. When the ring 58 on the turn remover C of FIG. 5 has been moved against the force of the spring 57 by the last hook and has become clear of the hook, it will, during its return motion, actuate the rod 36 of the turn direction finder. This is accomplished by action of the actuator 58b which moves, and the rod 71, shown schematically in FIG. 1, so as to push the rod 36 associated with the turn direction finder. One of the switches 37 is thus closed by releasing the member 30 as previously explained to give the correct voltage polarity to the potentiometer III, thus giving the correct direction for removing the turn. As will be understood, the shaft position of the potentiometer III is zero and no output is yet given to drive the motor VII and the turn remover C is stopped.

Figure 14:
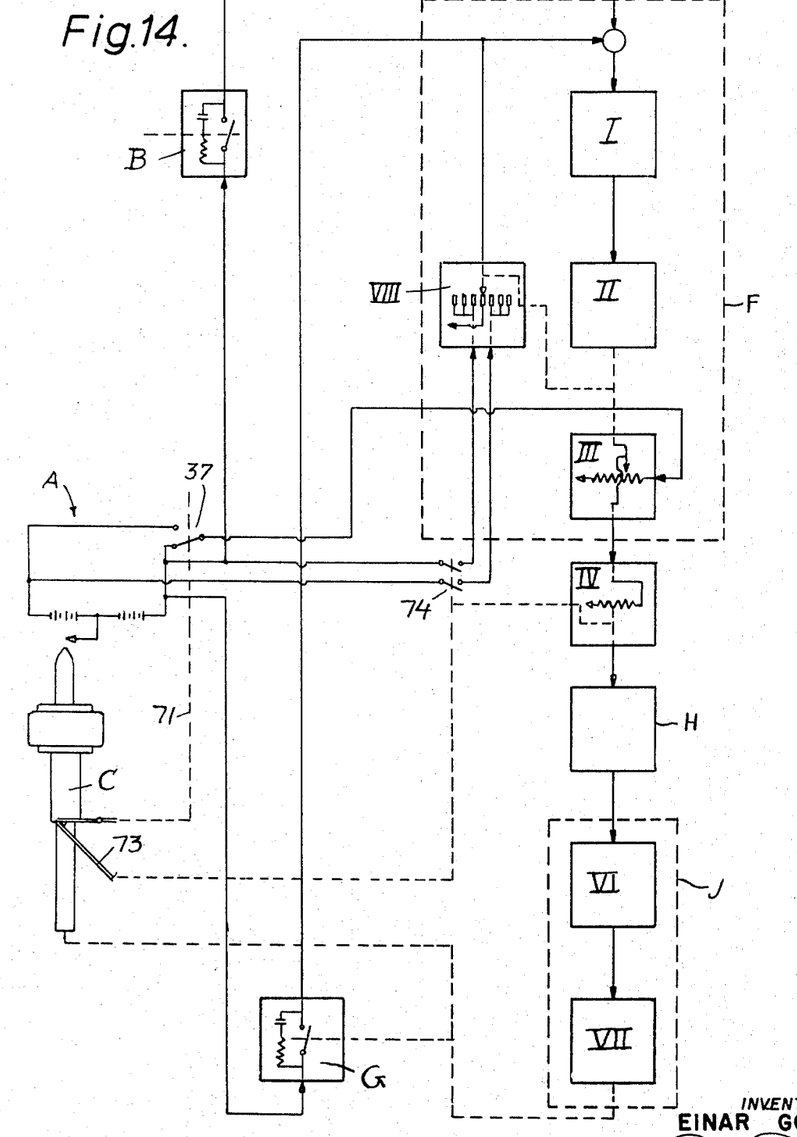
FIG. 14 is a schematic of the electrical control system for automatic control of the components of the device.

At this point the number of turns and the direction of the turns of the gangion to be unwound from the ground line are stored in the potentiometer III with the output of the potentiometer III being the supply voltage for the potentiometer IV which is mechanically connected to the spring loaded moving ring 58 of the turn remover by the spring loaded rod 73 as shown in FIG. 14. The hook, of course, continues to be moved by the ground line and enters the turn remover C. When the hook 3 enters the slot 42 in the pipe 40 of the turn remover C, the potentiometer IV has a shaft position which gives no output to the amplifier H but, when the hook contacts and moves the ring 58, the arm 73 is moved by the ring and shaft position of the potentiometer IV is increased until it reaches a maximum when the spring 57 is fully expanded and the hook leaves the turn remover. The potentiometer IV has increased its shaft position from 0 to a maximum proportionately to the hooks position in the turn remover, but, as the turns are removed, the output from the potentiometer III to potentiometer IV has steadily decreased by means presently to be described.

The output from the potentiometer IV was, therefore, zero at the beginning and end of its shaft position and at a maximum at the middle.

In this manner, the potentiometer IV will operate the hydraulic servo valve VI and start the hydraulic motor VII when the hook contacts the ring 58 and brings the motor up to maximum speed when the hook has advanced the ring mid-way in its travel and will reduce the speed to zero when the turns are removed and the hook is at the point of leaving the turn remover. This will give a smooth servo operation which would not be possible if the potentiometer IV were replaced by a switch for instance. The output of the potentiometer IV is the input of the amplifier H which drives the hydraulic valve VI and motor VII, which through the gears 53 and 54, shown in FIG. 5, drive the turn remover.

The shaft encoder G has the function of removing the stored pulses on the potentiometer III through the stepping motor II responsive to and proportional to the revolutions of the turn remover C. The encoder G also functions to provide an input signal to set the pulse generator VIII which drives the potentiometer III to compensate for pulses produced by the knots connecting the gangion to the ground line as will presently be explained. The shaft encoder G is mounted to the gear box K as shown in FIG. 1 and connected to the shaft of the motor unit J such that it gives an electric pulse for each revolution of the turn remover C and this pulse will drive the stepping motor II one step and reduce the output of the potentiometer III an amount equivalent to a turn removed by the turn remover. The turns stored on the potentiometer III are, in this manner, removed until output is zero and the turn remover stops. The potentiometer III has a wide zero range which has the effect of keeping the turn remover from removing the two to three first pulses produced by the gangions knot where it is tied to the line.

When the potentiometer III reaches null, the input from the encoder G to the pulse generator VIII also ceases and the generator VIII stops on its third segment and a switch 74 is closed by virtue of its mechanical connection to the rod 73 as indicated in FIG. 14. A circuit is completed through the pulse generator VIII in this way, and the pulse generator brings the potentiometer III back to the middle of the wide zero range in three steps since the potentiometer is mechanically connected to the pulse generator VIII as illustrated in FIG. 14. The contact arms of the pulse generator will make a pulse per segment and stop at the mid-segment of the generator. At this point, the potentiometer III sets at the middle of the wide zero range and is ready for storing the turns of the next gangion. When the hook 3 has left the turn remover, the ring 58 and the rod 73 return the potentiometer IV to its null position. Before the ring 58 has reached its end of travel to its initial condition, the switch 74 is opened again and the stored turns on the potentiometer III have been removed by the pulse generator VIII and the control system is ready for the next hook and gangion. Return of the ring also actuates the turn direction finder and the cycle repeats. While a specific electrical control system has been described, it will be understood that the details of the control system may be varied and replaced by other elements for performing the same function within the scope of the present invention.

The ground line and the unwound gangion leave the turn remover and enter the baiter D where the hook is baited and moved through the slot 63 and the block 64 as previously described in connection with FIGS. 9 through 13. If no special provision is made beyond this point, the hooks have a tendency to tangle themselves up with each other and the ground line. In accordance with the present invention one embodiment of an automatic coiling mechanism and slot for collecting the hooks is provided and illustrated in detail in FIGS. 15 through 19.

Figure 15:
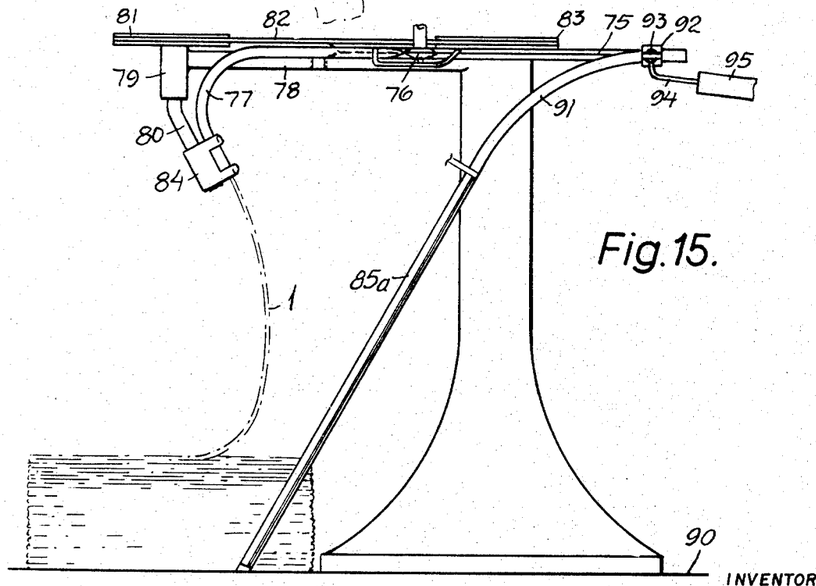
FIG. 15 is an elevational view of the gurdy with coiler and hook holder.
Figures 16, 17, 18, 19:
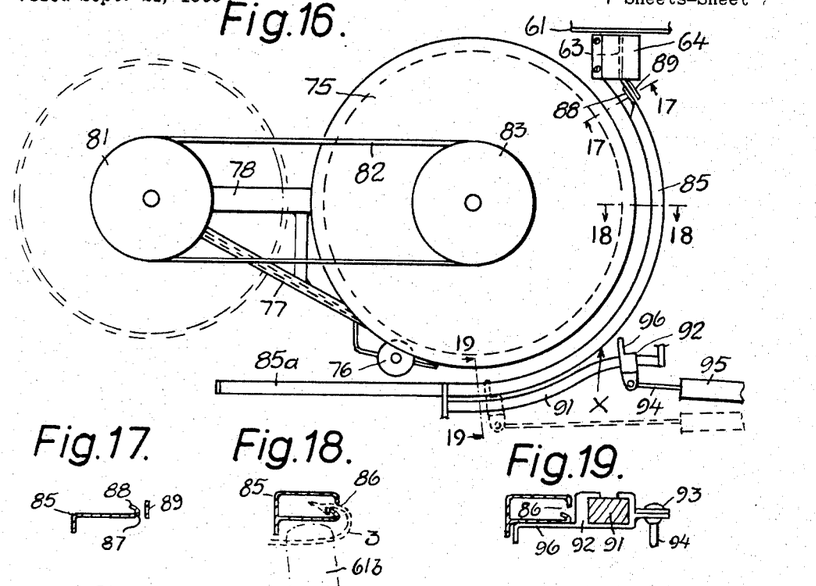
FIG. 16 is a plan view of the device shown in FIG. 15.
FIGS. 17–19 are cross sectional views taken along lines 17—17, 18—18 and 19—19 respectively of FIG. 16.

Referring to FIGS. 15 through 19, the ground line is pressed into the groove of the sheave of the gurdy S by the wheel 76 and moves from the groove through a flexible pipe 77 which has a slot through which the gangion extends. The end of the pipe 77 adjacent the gurdy S is made of rigid material and may extend into the groove of the gurdy sheave and is supported by attachment to an arm 78 carried by the gurdy as illustrated in FIGS. 15 and 16. The rigid end of the pipe 77 thus serves to force the ground line 1 and gangion 2 out of the groove of the sheave in case they tend to bind. The horizontal arm 78 is fixed to the gurdy and is provided with a bearing 79 for rotatably mounting with the vertical shaft 80 which has a sheave 81 fixed to its upper end. The sheave 81 is driven by a belt 82 which is in turn driven by a sheave 83 fixed to the powered sheave 75 of the gurdy. The lower portion of the shaft 80 is bent at an angle so as to give the ground line the desired coiling diameter. The outer or free end of the flexible pipe 77 is attached to the bent end of the shaft 80 by means of a bearing 84 such that the pipe's end which is parallel with the shaft coils the ground line 1 onto the deck in a desirable coil. The speed of the ground line relative to the speed of the shaft 80 determines the position and size of the coil.

Although it would be possible to dimension the pipe 77 large enough to allow the hook and bait to pass through together with the ground line, such an arrangement would be subject to many difficulties including possible loss of bait, snarling of hooks and other damage if the ground line were overly stiff. Accordingly, the present invention provides an improved device which moves the baited hooks from the baiting magazine D through a slotted holder 85 which runs parallel with the sheave 75. A portion of the holder 85 is removable and is bent downwardly to the deck. After the removable portion is filled with baited hooks for a skate, it is detached and moved together with the skate for setting. This keeps the baited hooks from getting tangled.

The holder 85 for moving the baited hooks is shown in detail in FIGS. 15 to 19. As illustrated, the holder 85 is parallel with the circumference of the sheave 75 and has a rectangular hollow cross section with a slot 86 in the outer side wall thereof as illustrated in FIGS. 18 and 19. The wall 87 of the holder below the slot 86 is bent inwardly such that it makes a curved edge 88 on which the baited hook slides and is kept from falling out of the holder. The entrance of the holder 85 is fastened to the blocks 64 behind the baiting magazine D in such a position that the baited hook 3 coming from the groove 63 in the block enters the holder 85 and slides on the side 87 and is kept from falling off by the edge 88. This relationship is shown clearly in FIG. 17. To facilitate the hooks entry into the holder 85, the top wall of the holder is omitted at the entrance as illustrated in FIGS. 16 and 17 and a guide plate 89 keeps the hook from falling off the edge 88 as it moves into the holder. The slot 86 is shaped in such a manner that the hook 3 cannot fall off while being dragged along the holder. The holder bends downwardly toward the deck where it is connected to a removable holder portion 85a which ends at the deck 90.

Along the outer side of the holder 85 and parallel with the same is a guide rod 91 which serves to mount a slidable pusher member 92. The pusher member 92 is connected by a universal joint 93 to the free end of a piston rod 94 of a double acting hydraulic cylinder 95, the other end of which may also be universally mounted. The slidable pusher member 92 is formed with an angle-shaped portion 96 which travels along the outer surface of the underside of the holder 85 as shown in FIG. 19. The end of the guide rod 91 adjacent the hydraulic cylinder 95 is bent out from the holder 85 such that the angle portion 96, when the piston rod is in its fully retracted position, allows a baited hook to pass by under tension of the gangion. The mounting means for the different parts described may be of any form and shape for convenience and are not shown here for the sake of simplicity.

The baited hooks are dragged by the gangion into the holder 85 and along the holder until they pass by the angle portion 96 of the pusher member 92 which is in its retracted position. At this point, the tension in the gangion ceases as a result of the ground line leaving the sheave 75 and being coiled. When the hook passes a point X on the holder 85 it opens a valve by means of a suitable contact member (not shown) to energize the cylinder 95 which moves the angle portion 96. The angle portion 96 pushes the hooks 3 with a bait 61b along the holder 85 until it reaches a previously located bait piece where it actuates a second contact member (not shown) to open a valve for returning the piston to its initial position. The baited hooks are in this manner moved one by one into the removable holder 85a until it is filled. The removable holder may then be detached and replaced with a new holder.

The above described mechanism may also be used for coiling the ground line and entering the hooks on the holder 85a without baiting the hooks after a fishing trip is over.

The described method and system of the present invention makes possible the handling of a ground line in a continuous and completely automatic process. The device will unwind the gangion if necessary, bait the hooks and place them in a holder while, at the same time, coiling the ground line onto the deck such that it is ready for the next setting. It will be readily apparent to those skilled in the art that the present invention provides novel and useful improvements in methods and devices for taking in, cleaning and baiting of a string of gear of the character described. The arrangement and types of structural components and the specific method steps described may be subjected to numerous modifications well within the purview of this invention and applicant intends only to be limited to a liberal interpretation of the specification and appended claims.

Having thus described the invention, what is claimed as new and desired to be secured by Letters Patent is:

1. A machine for handling a halibut long line or the like having gangions fixed at spaced intervals with hooks thereon, the fish having been removed from the hooks, comprising in combination; means for hauling in said line at a constant speed, an electrical control system, means for sensing the direction the gangion is wound about the line and storing the information in the control system, means for counting the number of turns of the gangion about the line and storing the information in the control system and means controlled by said control system for unwinding the turns of the gangion according to the stored information.

2. A machine for handling a halibut long line or the like having gangions fixed at spaced intervals with hooks thereon, the fish having been removed from the hooks, comprising in combination; means for hauling in said line at a constant speed, an electrical control system, means for sensing the direction the gangion is wound about the line and storing the information in the control system, means for counting the number of turns of the gangion about the line and storing the information in the control system, means controlled by said control system for unwinding the turns of the gangion according to the stored information, a movable bait magazine, means to move the hooks individually through said bait magazine for baiting the hooks, and means for coiling the line with the gangions and baited hooks oriented in a suitable manner for reuse.

3. A machine for handling a halibut long line or the like having gangions fixed at spaced intervals with hooks thereon, the fish having been removed from the hooks, comprising in combination; means for hauling in said line at a constant speed, said hauling means including a power driven sheave and means for aligning the incoming line with the groove of said sheave to prevent twisting of the line, a rotatable turn remover having means to engage the hook of the gangion and unwind the same about the line, an electrical control system including first and second potentiometer means, the output of the first potentiometer being the input of the second potentiometer, directing sensing means for sensing the direction each gangion is wound about the ground line and storing a polarity signal, means for releasing said polarity signal to control the polarity of said first potentiometer responsive to the completion of the operation of the turn remover on a preceding hook and gangion, means to produce a pulse for each turn of the gangion about the line and to store said pulses on said first potentiometer, means responsive to the movement of said hook through the turn remover for increasing the output of said second potentiometer from zero to a maximum, motor means for rotating said turn remover, means for energizing said motor means responsive to the output of said second potentiometer, and means for removing the pulses stored on said first potentiometer responsive to the rotation of the turn remover.

4. A system for unwinding hook bearing gangions from a halibut line or the like comprising in combination; means to haul in said line at a constant speed, said hauling means including a power driven sheave and means for aligning the incoming line with the groove of said sheave to prevent twisting of the line, a turn direction finder, said turn direction finder including means for sensing the direction in which said gangion is wound about the line as it is hauled in and storing a directional signal, a turn counter having means to contact the turns of the gangion about the line and to produce an electrical pulse for each said turn, rotatable turn removing means having an elongated hollow member through which said line passes, hook engaging means on said turn remover adapted to engage the hook on said gangion, motor means for rotating said turn remover, and an electrical control system for energizing said motor means, said control system including means to operate said motor means responsive to the signals produced by said direction finder and said turn counter to unwind the gangion from the line in the proper direction and the proper number of turns, said control system further including means to deenergize said motor means at the completion of the prescribed number of turns and to condition said control system to receive a signal produced by the next succeeding hook and gangion on the line.

5. The combination according to claim 4 wherein said turn direction finder comprises; first and second vertically spaced plates providing a groove through which said line passes, said plates being tapered in the direction of the incoming line for contacting the gangion disposed on either side of the line, a switch located on each side of said plates, settable switch operating means, contact means carried on said direction finder for contacting the moving hook to set said switch operating means to close one or the other of said switches, and release means carried by said direction finder to release said switch operating means responsive to a signal from said turn remover, whereby a directional signal is provided for said control system to determine the direction of rotation of said turn remover.

6. The combination according to claim 4 wherein said turn counter comprises; a backing member over which said line is moved, a first pivotally mounted arm having an offset head, means to bias said arm against the moving line with the offset head contacting the turns of the gangion about the line, a contact arm pivotally mounted on said head, switch means carried on said turn counter, one end of said contact arm being disposed to contact each turn of the gangion and the opposite end thereof disposed to actuate said switch, and spring bias means for biasing said contact arm into contact with said turns, whereby each turn of the gangion rocks said contact arm to close said switch to thereby produce a number of pulses corresponding to the number of turns of the gangion about the line.

7. The combination according to claim 4 wherein said elongated member comprises a hollow tube having a slot in one side extending the length thereof to receive said hook and guide the same along the length of the tube, said slot being in wave form and extending from one end of the tube over a substantial portion thereof and including a straight portion and a curved end portion adjacent the opposite end of the tube, a ring, means mounting said ring on said tube for rotation therewith and sliding movement therealong between the straight portion and the curved portion of the slot, a through slot in said ring corresponding in position to the curved portion of said slot, expansion spring means acting between said ring and said tube, said spring biasing said ring to a first position adjacent the straght portion of said slot, said hook contacting said ring to move it to a second position adjacent said curved portion whereby said hook is permitted to pass through the slot in said ring and out of said tube, first signal means responsive to the movement of the ring from said first position to control the output of said electrical control system to drive said motor proportionally to the movement of the hook through the turn remover, and second signal means responsive to the return of said ring to release the directional signal from the direction finder.

8. In combination with apparatus having means for hauling in a halibut long line or the like with hook bearing gangions thereon at a constant speed, sensing the direction and number of turns of the gangion about the line and removing the same, an automatic baiting device comprising; an elongated tube through which the line and gangions are moved, said tube having a slot in the upper side extending the length thereof for guiding the hook in an upright position, a rearwardly extending projection on the bottom side of said tube, hold down means mounted in spaced relation above said projection and spaced from the end of the tube, a bait magazine having a plurality of aligned adjacent bait pockets, each pocket including an opening in the back side and a vertical slot in the front side adjacent the end of the tube, means to support said magazine for moving said pockets into alignment with said tube with said opening and said slot registering wth said tube, and means for engaging the hook as it moves through said tube for advancing said magazine the distance of one pocket, whereby said hook passes through said slot to engage a piece of bait in said pocket and pull the same through the opening and beneath said hold down means.

9. In combination with apparatus having means for hauling in a halibut long line or the like with hook bearing gangions thereon at a constant speed, sensing the direction and number of turns of the gangion about the line and removing the same, an automatic baiting device comprising; an elongated tube providing a passage through which the line and gangions are moved, said tube having a slot in the upper side extending the length thereof for guiding the hook in an upright position, a bait magazine having aligned pockets, means for movably mounting said magazine to align said pockets with the passage through said tube, opening means in said pockets to permit entry of said hooks and removal of the bait, and actuator means responsive to the movement of the hook through the tube for moving said magazine to align successive pockets with the tube.

10. The combination according to claim 9 wherein said actuator means comprises; a vertical shaft, means mounting said shaft adjacent said tube, a rotatable sleeve mounted on said shaft, a first radially extending arm fixed to said sleeve, slot means in said tube, said first arm extending through said slot means in the path of the moving hook, a second radially extending arm fixed on said sleeve and angularly disposed relative to said first arm, said second arm disposed to contact said magazine and move the same upon rotation of said sleeve, and spring return means carried by said shaft for returning said sleeve, whereby said hook will contact said first arm to move said sleeve to operate said second arm for advancing the magazine.

11. A baiting device comprising; an elongated tube providing a passage through which a line with hook bearing gangions is moved, means to move said line, said tube having a slot in the upper side extending the length thereof for guiding the hook in an upright position, a bait magazine having aligned pockets, means for movably mounting said magazine to align said pockets with the passage through said tube, opening means in said pockets to permit entry of said hooks and removal of the bait, and actuator means responsive to the movement of the hook through the tube for moving said magazine to align successive pockets with the tube.

12. In combination with apparatus having means for hauling in a halibut long line or the like with hook bearing gangions thereon at a constant speed, means for sensing the direction and number of turns of the gangion about the line and removing the same, and means for baiting said hooks, a device for coiling said line and storing said baited hooks comprising; a flexible pipe for receiving said line, means to rotate the free end of said pipe to coil said line as it issues therefrom, a slot in said pipe through which said gangions extend, guide means extending parallel to the path of travel of said line, said guide means including a channel member having means for retaining said hooks, a removable hook and bait container, and means for successively moving the baited hooks from said channel member to said container.

References Cited

UNITED STATES PATENTS

| | | | |
|---|---|---|---|
| 2,511,828 | 6/1950 | Andrist | 43—4 |
| 2,518,590 | 8/1950 | Andrist | 43—4 |
| 2,670,556 | 3/1954 | Hopkins et al. | 43—4 |

FOREIGN PATENTS

| | | |
|---|---|---|
| 71,712 | 2/1947 | Norway. |
| 76,025 | 12/1949 | Norway. |
| 92,763 | 11/1958 | Norway. |
| 99,224 | 1/1962 | Norway. |

SAMUEL KOREN, *Primary Examiner.*

W. H. CAMP, *Assistant Examiner.*